United States Patent [19]
Conrad

[11] 4,350,415
[45] Sep. 21, 1982

[54] AUXILIARY LENS SYSTEM FOR OVERHEAD PROJECTORS

[75] Inventor: Lawrence H. Conrad, Maplewood, Minn.

[73] Assignee: Minnesota Mining & Manufacturing Company, St. Paul, Minn.

[21] Appl. No.: 183,205

[22] Filed: Sep. 2, 1980

[51] Int. Cl.³ .................... G02B 15/02; G02B 17/00
[52] U.S. Cl. ................................. 350/422; 350/445
[58] Field of Search ................. 350/422, 445; 353/66

[56] References Cited
U.S. PATENT DOCUMENTS

| | | | |
|---|---|---|---|
| 3,126,786 | 3/1964 | Appeldorn | 350/445 X |
| 3,357,775 | 12/1967 | Appeldorn et al. | 350/423 |
| 3,408,135 | 10/1968 | Appeldorn et al. | 350/445 |
| 3,675,998 | 7/1972 | Wilton | 350/422 X |

*Primary Examiner*—John K. Corbin
*Assistant Examiner*—Scott J. Sugarman
*Attorney, Agent, or Firm*—Cruzan Alexander; Donald M. Sell; John C. Barnes

[57] ABSTRACT

A pair of lenses placed one on each side of the projection head of a standard overhead projector can be utilized to change the focal length of the lens from 14 inches to 20 inches and produce the same image size at a projection distance of 15 feet as at a projection distance of only 9.4 feet.

2 Claims, 1 Drawing Figure

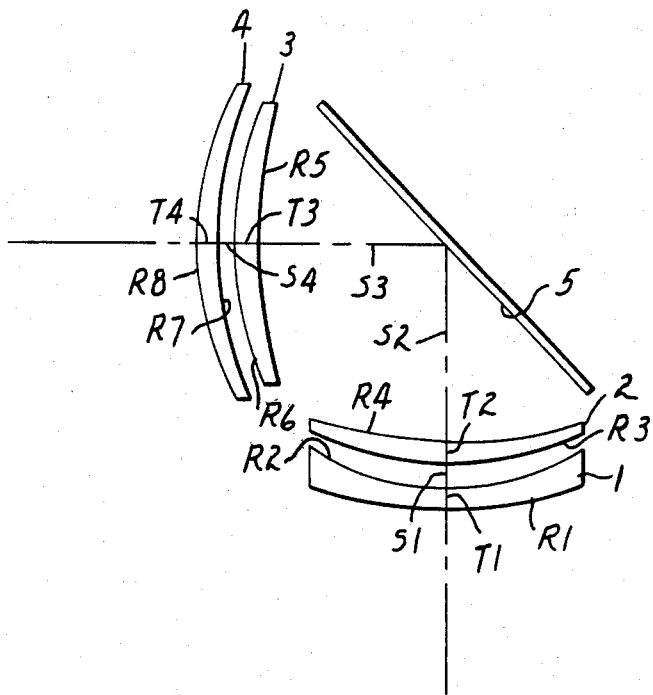

AUXILIARY LENS SYSTEM FOR OVERHEAD PROJECTORS

TECHNICAL FIELD

This invention relates to an improved lens system for an overhead projector and in one aspect to a pair of lenses adapted to be positioned one on each side of the projection head for changing the focal length of the objective lens and increasing the useful distance that the projector may be positioned from the screen.

BACKGROUND ART

The lens system of this invention comprises a pair of lenses, the first a negative meniscus lens and the second a positive meniscus lens, adapted to be placed on either side of a commercial projection head for an overhead projector to change the focal length of the objective lens and the magnification to increase the projection distance from 8 feet (244 cm) to 15 feet (457.2 cm).

Projection systems are known which utilize four elements in an objective lens but no prior art is known wherein a pair of lenses are provided which can be mounted in spaced relationship to the existing projection lenses in an overhead projector to produce a new lens system which can be utilized with the existing standard projection equipment without changing the standard position of the rear lens to the copy plane or make other equipment modifications.

DISCLOSURE OF INVENTION

The present invention is directed to a pair of lenses adapted to be mounted one on each side of the front and rear lenses of an overhead projector to change the focal length of the lens to project the image a greater distance than the standard projector. The lenses comprise a first negative meniscus lens, positioned adjacent the front lens of the overhead projector head, and a positive meniscus lens positioned adjacent the rear lens. The first additional lens has an effective focal length of $-331.952$ mm and the lens adjacent the rear lens has an effective focal length of 1095.75 mm. The two lenses together with the conventional projection lens provide a lens having an effective focal length of 530.28 mm with an f number of 9.52 and a magnification of 7.3 times. The back focal length is 294.408 mm and the front focal length is 656.326 mm. The spacing of the front lens from the front projection lens of 8 mm and the spacing of the rear lens from the rear projection lens by 5 mm provides ample room for utilizing a pivotally supported mounting bracket for the lens to permit the lens to be pivoted from an out-of-the-way position to the optical position for use with the overhead projector.

BRIEF DESCRIPTION OF DRAWINGS

The drawing discloses schematically the lens system for the projection lens of an overhead projector together with the two additional lenses constructed in accordance with the present invention.

BEST MODE FOR CARRYING OUT THE INVENTION

As illustrated in the drawing, the conventional overhead projection head utilizes a pair of positive meniscus lenses 2 and 3 positioned in spaced relationship along the optic axis and in an annular relationship to each other and to a plano mirror 5. These projection lenses provide an optical system having a focal length of 14 inches (355.6 mm) and a magnification of 6X with a projection distance of approximately 8 feet, actually 7.9 feet, (2438 mm) from the front lens surface to the screen. The lenses 2 and 3 are spaced from the mirror reflecting surface along the optic axis by a distance of 63.5 mm.

There are applications where it is preferred that the overhead projector be spaced from the screen a distance greater than 2438 mm, and yet produce the same size of projected image. Thus, to increase the distance to 12.5 feet (3810 mm) and achieve the same 6X or substantially the same magnification, the lens must be changed to provide a greater focal length. Thus, by the use of two additional spherical lenses, 1 and 4, in accordance with the present invention, the focal length of the system was increased to 20.88 inches (530.28 mm). This was achieved by a first negative miniscus lens having an effective focal length of $-331.952$ mm positioned in spaced relation of 8 mm from the front projection lens 2 and a second positive meniscus lens 4 spaced a distance of 5.0 mm from the rear projection lens and having an effective focal length of 1095.75 mm.

Lens 1 is preferably coated on both surfaces with magnesium fluoride ($MgF_2$) that will provide a reduction in reflectivity from the surfaces and the lens preferably has a diameter of 91.95 mm. Lens 4 is preferably rectangular in shape having a length and width of 102.0 mm, with truncated corners truncated on a radius of 62.5 mm. The lens is preferably coated on both surfaces with magnesium fluoride ($MgF_2$) to reduce the reflectivity from the surfaces of the lens.

An example of the total lens system with the two additional lenses in place providing for the 7.3X magnification, a back focal length of 294.408 mm and a front focal length of 656.326 mm, is illustrated in the following table wherein R is the radius of curvature of the lens refracting surfaces numbered consecutively from the front toward the rear; T is the axial thickness of the lens measured along the optic axis; S is the axial air spacing between the lenses; N is the refractive index (for d line) of the lens glasses and V equals the Abbe number of the lens glasses used.

| LENS | $N_d$ | $V_d$ | MM | MM |
|---|---|---|---|---|
| 1. | $1.523 \pm .001$ | $58.6 \pm .5$ | $R_1 = -162.87$ | $T_1 = 7.0 \pm .25$ |
|  |  |  | $R_2 = -82.8$ | $S_1 = 8.0$ |
| 2. | $1.523 \pm .001$ | $58.6 \pm .5$ | $R_3 = -107 \pm .2$ | $T_2 = 7.00 \pm 0.3$ |
|  |  |  | $R_4 = -153.5 \pm .3$ | $S_2 + S_3 = 127.0$ |
| 3. | $1.523 \pm .001$ | $58.6 \pm .5$ | $R_5 = +153.5 \pm 0.3$ | $T_3 = 8.00 + .25 - .15$ |

| LENS | Nd | Vd | MM | MM |
|---|---|---|---|---|
| | | | -continued | |
| | | | $R_6 = +105.00 \pm 0.20$ | |
| | | | | $S_4 = 5.0$ |
| | | | $R_7 = +120.6$ | |
| 4. | $1.523 \pm .001$ | $58.6 \pm .5$ | | $T_4 = 7.0 \pm .25$ |
| | | | $R_8 = +97.65$ | |

The distance between the lens 1 and the standard 10 inch by 10 inch (254×254 mm) stage of the overhead projector to achieve 7.3X magnification will be 366.22 mm avoiding the need to remount or reposition the standard head in anyway, except for the vertical position adjustment on the support post, allowed for focusing. The spacing between the lenses 1 and 4 and the standard lenses, permit them to be mounted in articulating frames supported on the projection head of the overhead projector affording facile positioning of the auxiliary lenses in place.

The four element projection lens of this invention thus affords a 7.3X magnification with a minimum image projection distance of 9.4 feet (2865 mm) and a maximum projection distance of 14.9 feet (4541.5 mm).

Therefore, with the standard 14 inch lenses 2 and 3 a projection of 6X magnification can be achieved at 7.9 feet, throw distance, and by adding the lenses 1 and 4 the 6X magnification is achieved at 12.6 feet. See the following table:

| | Throw Distance (feet) | |
|---|---|---|
| Magnification | 335 mm Standard | 530 mm New |
| 6X | 7.9 | 12.6 |
| 7.3X | 9.4 | 14.9 |

Having described the present invention with relation to the preferred illustrated embodiment, it will be appreciated by those skilled in the art that the structure may be scaled up or down without departing from the invention as claimed below.

I claim:

1. Auxiliary lenses for use in conjunction with the projection system in an overhead projector having a pair of converging meniscus lenses angularly positioned with relationship to each other and to a plano reflector, said auxiliary lenses comprising a first lens positioned adjacent the stage and having negative power and an equivalent focal length of 331.952 mm and radii of curvature for the surfaces of −162.87 mm and −82.2 mm and a thickness of 7.0 mm; and a second lens positioned adjacent the screen and having a positive power and an equivalent focal length of 1095.75 mm and radii of curvature for the surfaces of +120.60 mm and +97.65 mm and a thickness of 7.0 mm said lenses adapted to be mounted one on each side of the converging meniscus lenses to change the focal length of the system.

2. A projection lens for use with an overhead projector having a conventional stage and comprising four spherical lens elements having the following constructional data wherein the radii of curvature of the refracting surfaces, the axial air separation or thicknesses of the lenses, the refractive indices (N) for the d-line and the Abbe dispersive numbers (V) are recited below with subscripts in order from the stage toward the screen

| ELEMENT | Nd | Vd | mm | mm |
|---|---|---|---|---|
| | | | $R_1 = -162.87$ | |
| 1. | 1.523 | 58.6 | | $T_1 = 7.0$ |
| | | | $R_2 = -82.8$ | |
| | | | | $S_1 = 8.0$ |
| | | | $R_3 = -107$ | |
| 2. | 1.523 | 58.6 | | $T_2 = 7.00$ |
| | | | $R_4 = -153.5$ | |
| | | | | $S_2 + S_3 = 127.0$ |
| | | | $R_5 = +153.5$ | |
| 3. | 1.523 | 58.6 | | $T_3 = 8.00$ |
| | | | $R_6 = +105.00$ | |
| | | | | $S_4 = 5.0$ |
| | | | $R_7 = +120.6$ | |
| 4. | 1.523 | 58.6 | | $T_4 = 7.0$ |
| | | | $R_8 = +97.65$ | |

* * * * *